United States Patent
Takeyama et al.

(10) Patent No.: US 11,584,831 B2
(45) Date of Patent: *Feb. 21, 2023

(54) METHOD OF PRODUCING SLURRY, METHOD OF PRODUCING COMPOSITE RESIN MATERIAL, AND METHOD OF PRODUCING SHAPED PRODUCT

(71) Applicant: ZEON CORPORATION, Tokyo (JP)

(72) Inventors: Yoshihisa Takeyama, Tokyo (JP); Makoto Takeshita, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 388 days.

This patent is subject to a terminal disclaimer.

(21) Appl. No.: 16/335,815

(22) PCT Filed: Sep. 28, 2017

(86) PCT No.: PCT/JP2017/035335
§ 371 (c)(1),
(2) Date: May 30, 2019

(87) PCT Pub. No.: WO2018/066458
PCT Pub. Date: Apr. 12, 2018

(65) Prior Publication Data
US 2019/0276613 A1    Sep. 12, 2019

(30) Foreign Application Priority Data
Oct. 3, 2016 (JP) .............. JP2016-195973

(51) Int. Cl.
*C08J 3/205* (2006.01)
*C08K 3/04* (2006.01)
*C08K 7/06* (2006.01)
*C08J 3/02* (2006.01)
*C08L 101/00* (2006.01)

(52) U.S. Cl.
CPC ............. *C08J 3/205* (2013.01); *C08J 3/02* (2013.01); *C08K 3/04* (2013.01); *C08K 3/046* (2017.05); *C08K 7/06* (2013.01); *C08L 101/00* (2013.01); *C08K 2201/011* (2013.01)

(58) Field of Classification Search
CPC .. C08J 3/205; C08J 3/02; C08K 3/046; C08K 3/04; C08K 7/06; C08K 2201/011; C08L 101/00
See application file for complete search history.

(56) References Cited

U.S. PATENT DOCUMENTS

| | | | | |
|---|---|---|---|---|
| 10,138,347 B2 * | 11/2018 | Shigeta | ........... | C01B 32/05 |
| 10,414,896 B2 * | 9/2019 | Komatsu | ........... | C08J 3/212 |
| 2006/0263588 A1 * | 11/2006 | Handa | ........... | B82Y 40/00 |
| | | | | 428/292.1 |
| 2008/0318049 A1 | 12/2008 | Hata et al. | | |
| 2014/0302336 A1 * | 10/2014 | Heiskanen | ........... | D21H 19/40 |
| | | | | 428/535 |
| 2017/0121178 A1 * | 5/2017 | Shigeta | ........... | C01B 32/05 |
| 2018/0208738 A1 | 7/2018 | Komatsu et al. | | |
| 2019/0276610 A1 * | 9/2019 | Takeyama | ........... | C08K 3/041 |
| 2019/0276613 A1 * | 9/2019 | Takeyama | ........... | C08K 3/04 |
| 2020/0024409 A1 * | 1/2020 | Takeyama | ........... | C08J 5/042 |

FOREIGN PATENT DOCUMENTS

| | | | |
|---|---|---|---|
| JP | 2012210796 A | | 11/2012 |
| JP | 2015030821 A | | 2/2015 |
| JP | 2015030821 | * | 3/2015 |
| WO | 2006011655 A1 | | 2/2006 |
| WO | 2015182058 A1 | | 12/2015 |
| WO | 2017022229 A1 | | 2/2017 |

OTHER PUBLICATIONS

Apr. 9, 2019, International Preliminary Report on Patentability issued in the International Patent Application No. PCT/JP2017/035335.
Charles M. Hansen, "Hansen Solubility Parameters: A User's Handbook, Second Edition", Jun. 15, 2007, CRC Press.
Dec. 26, 2017, International Search Report issued in the International Patent Application No. PCT/JP2017/035335.

* cited by examiner

*Primary Examiner* — Robert S Jones, Jr.
*Assistant Examiner* — Jiangtian Xu
(74) *Attorney, Agent, or Firm* — Kenja IP Law PC

(57) ABSTRACT

Provided is a method of producing a slurry that enables simple production of a slurry in which fibrous carbon nanostructures are favorably dispersed. The method of producing a slurry includes: a mixing step of mixing resin particles having an average particle diameter of at least 1 μm and not more than 700 μm, fibrous carbon nanostructures, and a dispersion medium to obtain a mixed liquid; and a dispersing step of subjecting the mixed liquid to dispersion treatment using a wet medialess disperser under conditions in which pressure acting on the mixed liquid (gauge pressure) is 5 MPa or less to obtain a slurry. The fibrous carbon nanostructures preferably include carbon nanotubes.

8 Claims, No Drawings

METHOD OF PRODUCING SLURRY, METHOD OF PRODUCING COMPOSITE RESIN MATERIAL, AND METHOD OF PRODUCING SHAPED PRODUCT

TECHNICAL FIELD

The present disclosure relates to methods of producing a slurry, a composite resin material, and a shaped product, and, in particular, relates to a method of producing a slurry containing resin particles and fibrous carbon nanostructures, a method of producing a composite resin material using the slurry, and a method of producing a shaped product using the composite resin material.

BACKGROUND

Fibrous carbon nanostructures such as carbon nanotubes (hereinafter, also referred to as "CNTs") are being investigated for use in a wide range of applications due to excelling in terms of electrical conductivity, thermal conductivity, sliding properties, mechanical properties, and so forth.

Moreover, in recent years, development has been ongoing in relation to techniques for exploiting the excellent properties of fibrous carbon nanostructures by combining resin materials and fibrous carbon nanostructures in order to provide composite resin materials that have both resin properties, such as processability and strength, and fibrous carbon nanostructure properties, such as electrical conductivity.

From a viewpoint of favorably improving electrical conductivity and mechanical properties of a composite resin material, it is necessary to uniformly disperse fibrous carbon nanostructures such as CNTs in a matrix of a resin material. A technique has been proposed in which a slurry obtained through mixing of a resin material and a dispersion liquid of fibrous carbon nanostructures uniformly dispersed in a dispersion medium is used to produce a composite resin material so as to obtain a composite resin material having the fibrous carbon nanostructures uniformly dispersed in a matrix of the resin material.

In one specific example described in PTL 1, a composite resin material in which CNTs are favorably dispersed is produced through solidification of a slurry obtained by mixing a resin latex with a dispersion liquid prepared by carrying out a plurality of repetitions of a dispersing step including at least one cycle of dispersion treatment in which pressure is applied to a coarse dispersion liquid containing CNTs and a dispersion medium, the coarse dispersion liquid is fed under pressure, and shear force is applied to the coarse dispersion liquid such as to disperse the CNTs. The plurality of repetitions of the dispersing step are performed while altering the pressure that is applied to the coarse dispersion liquid.

CITATION LIST

Patent Literature

PTL 1: WO 2015/182058 A1

SUMMARY

Technical Problem

However, with respect to the conventional slurry described above that is obtained by adding a resin material to a dispersion liquid obtained by dispersing fibrous carbon nanostructures in a dispersion medium, there is room for improvement in terms of further improving the dispersion state of the fibrous carbon nanostructures so as to enable production of a composite resin material having excellent electrical conductivity and mechanical properties. There is also room for improvement of the conventional method of producing a slurry described above in terms that operations in production of the slurry are complicated.

Accordingly, one objective of the present disclosure is to provide a method of producing a slurry that enables simple production of a slurry in which fibrous carbon nanostructures are favorably dispersed.

Another objective of the present disclosure is to provide methods of producing a composite resin material and a shaped product having excellent properties such as electrical conductivity.

Solution to Problem

The inventors conducted diligent investigation in order to achieve the objectives described above. As a result, the inventors discovered that through medialess wet dispersion of a mixed liquid containing resin particles having a specific average particle diameter, fibrous carbon nanostructures, and a dispersion medium, without substantial application of pressure, it is possible to easily produce a slurry in which the fibrous carbon nanostructures are favorably dispersed. In this manner, the inventors completed the present disclosure.

Specifically, the present disclosure aims to advantageously solve the problem set forth above by disclosing a method of producing a slurry comprising: a mixing step of mixing resin particles having an average particle diameter of at least 1 μm and not more than 700 μm, fibrous carbon nanostructures, and a dispersion medium to obtain a mixed liquid; and a dispersing step of subjecting the mixed liquid to dispersion treatment using a wet medialess disperser under conditions in which pressure acting on the mixed liquid, in terms of gauge pressure, is 5 MPa or less to obtain a slurry. By subjecting a mixed liquid containing resin particles having a specific average particle diameter, fibrous carbon nanostructures, and a dispersion medium to dispersion treatment using a wet medialess disperser under conditions in which pressure acting on the mixed liquid (gauge pressure) is 5 MPa or less as set forth above, a slurry in which the fibrous carbon nanostructures are favorably dispersed can easily be obtained.

The "average particle diameter" referred to in the present disclosure can be determined by measuring a particle size distribution (volume basis) by dry laser diffraction/scattering and then calculating a particle diameter at which a cumulative value of volume probability density reaches 50%.

In the presently disclosed method of producing a slurry, the wet medialess disperser is preferably a homogenizer or an inline mixer. This is because dispersibility of the fibrous carbon nanostructures in the slurry can be further increased when a homogenizer or an inline mixer is used.

In the presently disclosed method of producing a slurry, content of the resin particles in the mixed liquid is preferably at least 1 mass % and not more than 30 mass %. This is because dispersibility of the fibrous carbon nanostructures in the slurry can be further increased when the content of the resin particles is within the range set forth above.

In the presently disclosed method of producing a slurry, a Hansen solubility parameter distance R of the dispersion medium and a resin forming the resin particles, obtained by formula (1) shown below, is preferably at least 2 and not more than 14. This is because dispersibility of the fibrous carbon nanostructures in the slurry can be further increased when R determined by formula (1) is within the range set forth above.

$$R = \{4 \times (\delta_{d1} - \delta_{d2})^2 + (\delta_{p1} - \delta_{p2})^2 + (\delta_{h1} - \delta_{h2})^2\}^{1/2} \quad (1)$$

$\delta_{d1}$: dispersion term of resin, $\delta_{d2}$: dispersion term of dispersion medium, $\delta_{p1}$: polarity term of resin, $\delta_{p2}$: polarity term of dispersion medium, $\delta_{h1}$: hydrogen bonding term of resin, $\delta_{h2}$: hydrogen bonding term of dispersion medium In the presently disclosed method of producing a slurry, the mixed liquid preferably contains the fibrous carbon nanostructures in a proportion of at least 0.01 parts by mass and not more than 10 parts by mass per 100 parts by mass of the resin particles. This is because dispersibility of the fibrous carbon nanostructures in the slurry can be further increased when the content of the fibrous carbon nanostructures is within the range set forth above.

In the presently disclosed method of producing a slurry, fluororesin particles, acrylic resin particles, polycarbonate resin particles, or cycloolefin resin particles may be used as the resin particles.

Moreover, the present disclosure aims to advantageously solve the problem set forth above by disclosing a method of producing a composite resin material comprising a step of removing the dispersion medium from a slurry produced using any one of the methods of producing a slurry set forth above to form a composite resin material. By removing the dispersion medium from the slurry produced using the method of producing a slurry, a composite resin material is obtained that enables formation of a shaped product in which dispersibility of fibrous carbon nanostructures is excellent and that has high electrical conductivity.

Furthermore, the present disclosure aims to advantageously solve the problem set forth above by disclosing a method of producing a shaped product comprising a step of shaping a composite resin material produced using the method of producing a composite resin material set forth above. By using the composite resin material produced using the method of producing a composite resin material, a shaped product in which dispersibility of fibrous carbon nanostructures is excellent and that has high electrical conductivity is obtained.

Advantageous Effect

A slurry in which fibrous carbon nanostructures are favorably dispersed can easily be produced through the presently disclosed method of producing a slurry.

Moreover, a composite resin material capable of forming a shaped product in which dispersibility of fibrous carbon nanostructures is excellent and that has excellent electrical conductivity is obtained through the presently disclosed method of producing a composite resin material.

Furthermore, a shaped product having excellent properties such as electrical conductivity is obtained through the presently disclosed method of producing a shaped product.

DETAILED DESCRIPTION

The following provides a detailed description of embodiments of the present disclosure.

The presently disclosed method of producing a slurry can be used in production of a slurry containing a resin, fibrous carbon nanostructures, and a dispersion medium. Moreover, a slurry produced using the presently disclosed method of producing a slurry can be used in production of a composite resin material using the presently disclosed method of producing a composite resin material. Furthermore, a composite resin material produced using the presently disclosed method of producing a composite resin material can be used in production of a shaped product using the presently disclosed method of producing a shaped product.

A shaped product produced using the presently disclosed method of producing a shaped product is useful as an integrated circuit tray, a wafer carrier, or a sealing material, for example, due to having excellent electrical conductivity and low surface resistivity, and displaying antistatic performance, but is not specifically limited to these uses.

(Method of Producing Slurry)

In the presently disclosed method of producing a slurry, a slurry that contains a resin, fibrous carbon nanostructures, and a dispersion medium and that optionally further contains additives such as a dispersant is produced. The presently disclosed method of producing a slurry includes: a mixing step of mixing resin particles having an average particle diameter of at least 1 μm and not more than 700 μm, fibrous carbon nanostructures, a dispersion medium, and optional additives to obtain a mixed liquid; and a dispersing step of subjecting the mixed liquid obtained in the mixing step to dispersion treatment using a wet medialess disperser under conditions in which pressure acting on the mixed liquid (gauge pressure) is 5 MPa or less to obtain a slurry.

Since the mixed liquid containing the resin particles and the fibrous carbon nanostructures is subjected to dispersion treatment under conditions in which the pressure is 5 MPa or less according to the presently disclosed method of producing a slurry, it is possible to obtain a slurry in which the fibrous carbon nanostructures are favorably dispersed. Moreover, production of the slurry is easy compared to a case in which resin is added after preparation of a dispersion liquid of fibrous carbon nanostructures or in which dispersion treatment is performed under high pressure, for example.

Although it is not clear why the fibrous carbon nanostructures are favorably dispersed in the presently disclosed method of producing a slurry, the reason for this is presumed to be that the resin particles act like dispersing media in the dispersion treatment.

<Mixing Step>

In the mixing step, a mixed liquid is prepared by mixing specific resin particles, fibrous carbon nanostructures, a dispersion medium, and optional additives.

[Resin Particles]

A resin forming the resin particles is not specifically limited and may be any resin such as a styrene resin, acrylic resin, methacrylic resin, organic acid vinyl ester resin, vinyl ether resin, fluororesin, olefinic resin, alicyclic olefinic resin, polycarbonate resin, polyester resin, polyamide resin, thermoplastic polyurethane resin, polysulfone resin, polyphenylene ether resin, or silicone resin. Of these examples, a fluororesin, acrylic resin, polycarbonate resin, or cycloolefin resin is preferable as the resin, a fluororesin or acrylic resin is more preferable as the resin, and a fluororesin is even more preferable as the resin.

Note that the resin particles may be formed by one type of resin, or may be formed by two or more types of resins.

The fluororesin may, for example, be polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-ethylene copolymer (ETFE), polychlorotrifluoroethylene (PCTFE), chlorotrifluoroethylene-ethyl ene copolymer (ECTFE), polyvinylidene fluoride (PVDF), polyvinyl fluoride (PVF), or the like. Of these examples, the fluororesin is preferably PTFE or PFA, and more preferably PTFE.

Moreover, polymethyl methacrylate (PMMA), for example, is preferable as the acrylic resin.

The Rockwell hardness (M scale-converted value) of the resin particles is preferably 120 or less, more preferably 110 or less, and even more preferably 100 or less. When the Rockwell hardness of the resin particles is 120 or less, dispersibility can be improved while also inhibiting damage to the fibrous carbon nanostructures in the dispersing step. This enables further reduction of surface resistivity of a shaped product.

The "Rockwell hardness" referred to herein can be measured in accordance with JIS K7202.

The average particle diameter of the resin particles is required to be at least 1 µm and not more than 700 µm, is preferably 5 µm or more, more preferably 10 µm or more, and even more preferably 50 µm or more, and is preferably 650 µm or less, and more preferably 600 µm or less. Dispersibility of the fibrous carbon nanostructures can be further improved when the average particle diameter of the resin particles is 1 µm or more. Moreover, slurry producibility can be improved when the average particle diameter of the resin particles is 700 µm or less.

Note that the aspect ratio (major diameter/minor diameter) of the resin particles is normally at least 1 and not more than 10.

The amount of the resin particles in the mixed liquid (100 mass %) is preferably 1 mass % or more, and more preferably 3 mass % or more, and is preferably 30 mass % or less, and more preferably 25 mass % or less. When the amount of the resin particles is at least any of the lower limits set forth above, the fibrous carbon nanostructures can be favorably dispersed in dispersion treatment. Moreover, when the amount of the resin particles is not more than any of the upper limits set forth above, the fibrous carbon nanostructures can be favorably dispersed and reduction of electrical conductivity of a composite resin material and a shaped product produced using the slurry can be inhibited.

[Fibrous Carbon Nanostructures]

No specific limitations are placed on the fibrous carbon nanostructures. For example, fibrous carbon nanostructures having electrical conductivity may be used. Specific examples of usable fibrous carbon nanostructures include cylindrical carbon nanostructures such as carbon nanotubes (CNTs) and non-cylindrical carbon nanostructures such as carbon nanostructures having a network of 6-membered carbon rings in the form of flattened cylindrical shape. One type of fibrous carbon nanostructure may be used individually, or two or more types of fibrous carbon nanostructures may be used in combination.

Of the above-described examples, fibrous carbon nanostructures including CNTs are preferably used as the fibrous carbon nanostructures. This is because by using fibrous carbon nanostructures that include CNTs, it is possible to efficiently impart electrical conductivity to a composite resin material and a shaped product and reduce surface resistivity of the shaped product even using only a small amount of the fibrous carbon nanostructures.

The fibrous carbon nanostructures including CNTs may be composed of only CNTs or may be a mixture of CNTs and fibrous carbon nanostructures other than CNTs.

The CNTs included among the fibrous carbon nanostructures are not specifically limited and may be single-walled carbon nanotubes and/or multi-walled carbon nanotubes. However, the CNTs are preferably carbon nanotubes having one to five walls, and are more preferably single-walled carbon nanotubes. This is because electrical conductivity of a composite resin material and a shaped product can be improved and surface resistivity of the shaped product can be reduced using a smaller amount of carbon nanotubes when carbon nanotubes having fewer walls are used.

The average diameter of the fibrous carbon nanostructures is preferably 1 nm or more, and is preferably 60 nm or less, more preferably 30 nm or less, and even more preferably 10 nm or less. Dispersibility of the fibrous carbon nanostructures can be increased and electrical conductivity can be imparted to a composite resin material and a shaped product in a stable manner when the average diameter of the fibrous carbon nanostructures is 1 nm or more. Moreover, electrical conductivity can be efficiently imparted to a composite resin material and a shaped product even using only a small amount of fibrous carbon nanostructures when the average diameter of the fibrous carbon nanostructures is 60 nm or less. Therefore, shaped product surface resistivity can be sufficiently reduced when the average diameter of the fibrous carbon nanostructures is within any of the ranges set forth above.

The "average diameter of fibrous carbon nanostructures" referred to in the present disclosure can be determined by measuring the diameters (external diameters) of 20 fibrous carbon nanostructures, for example, in a transmission electron microscope (TEM) image and then calculating a number-average value of the diameters.

The fibrous carbon nanostructures are preferably fibrous carbon nanostructures for which a ratio $3\sigma/Av$ of a value $3\sigma$ (value obtained by multiplying the diameter standard deviation ($\sigma$: sample standard deviation) by 3) relative to the average diameter Av is more than 0.20 and less than 0.60, more preferably fibrous carbon nanostructures for which $3\sigma/Av$ is more than 0.25, and even more preferably fibrous carbon nanostructures for which $3\sigma/Av$ is more than 0.40. Performance of a produced composite resin material and shaped product can be further improved when fibrous carbon nanostructures for which $3\sigma/Av$ is more than 0.20 and less than 0.60 are used.

The average diameter Av and the standard deviation $\sigma$ of the fibrous carbon nanostructures may be adjusted by altering the production method and the production conditions of the fibrous carbon nanostructures, or by combining a plurality of types of fibrous carbon nanostructures obtained by different production methods.

The fibrous carbon nanostructures that are used typically take a normal distribution when a plot is made of diameter measured as described above on a horizontal axis and probability density thereof on a vertical axis, and a Gaussian approximation is made.

The average length of the fibrous carbon nanostructures is preferably 10 µm or more, more preferably 50 µm or more, and even more preferably 80 µm or more, and is preferably 600 µm or less, more preferably 550 µm or less, and even more preferably 500 µm or less. A conduction path can be formed in a composite resin material and a shaped product using a small amount of fibrous carbon nanostructures and dispersibility of the fibrous carbon nanostructures can be improved when the average length thereof is 10 µm or more. Moreover, electrical conductivity of a composite resin material and a shaped product can be stabilized when the average length is 600 µm or less. Therefore, shaped product surface resistivity can be sufficiently reduced when the average length of the fibrous carbon nanostructures is within any of the ranges set forth above.

The average length of "fibrous carbon nanostructures" referred to in the present disclosure can be determined by measuring the lengths of 20 fibrous carbon nanostructures, for example, in a scanning electron microscope (SEM) image and then calculating a number-average value of the lengths.

The fibrous carbon nanostructures normally have an aspect ratio of more than 10. The aspect ratio of the fibrous carbon nanostructures can be determined by measuring the diameters and lengths of 100 randomly selected fibrous carbon nanostructures using a scanning electron microscope or a transmission electron microscope, and then calculating an average value for the ratio of diameter and length (length/diameter).

The BET specific surface area of the fibrous carbon nanostructures is preferably 200 $m^2/g$ or more, more preferably 400 $m^2/g$ or more, and even more preferably 600 $m^2/g$ or more, and is preferably 2,000 $m^2/g$ or less, more preferably 1,800 $m^2/g$ or less, and even more preferably 1,600 $m^2/g$ or less. When the BET specific surface area of the fibrous carbon nanostructures is 200 $m^2/g$ or more, dispersibility of the fibrous carbon nanostructures can be increased, and electrical conductivity of a composite resin material and a shaped product can be sufficiently increased and surface resistivity of the shaped product can be sufficiently reduced using a small amount of the fibrous carbon nanostructures. Moreover, electrical conductivity of a composite resin material and a shaped product can be stabilized when the BET specific surface area of the fibrous carbon nanostructures is 2,000 $m^2/g$ or less.

Herein, the term "BET specific surface area" refers to nitrogen adsorption specific surface area measured by the BET method.

The fibrous carbon nanostructures preferably exhibit a convex upward shape in a t-plot obtained from an adsorption isotherm. The t-plot can be obtained from an adsorption isotherm of the fibrous carbon nanostructures measured by a nitrogen gas adsorption method by converting relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0 to perform this conversion and obtain a t-plot for the fibrous carbon nanostructures (t-plot method of de Boer et al.).

In the case of a material having pores at the surface thereof, growth of the adsorbed layer of nitrogen gas is categorized into the following processes (1) to (3). The gradient of the t-plot changes in accordance with processes (1) to (3).

(1) A process in which a single molecular adsorption layer of nitrogen molecules is formed over the entire surface (2) A process in which a multi-molecular adsorption layer is formed and is accompanied by capillary condensation filling of pores (3) A process in which a multi-molecular adsorption layer is formed at a surface that appears to be non-porous due to the pores being filled by nitrogen The t-plot forming a convex upward shape is on a straight line passing through the origin in a region in which the average adsorbed nitrogen gas layer thickness t is small, but, as t increases, the plot deviates downward from the straight line. When fibrous carbon nanostructures have a t-plot shape such as described above, this indicates that the fibrous carbon nanostructures have a large ratio of internal specific surface area relative to total specific surface area and that there is a large number of openings in carbon nanostructures constituting the fibrous carbon nanostructures.

A bending point of the t-plot for the fibrous carbon nanostructures is preferably within a range of $0.2 \leq t$ (nm) $\leq 1.5$, more preferably within a range of $0.45 \leq t$ (nm) $\leq 1.5$, and even more preferably within a range of $0.55 \leq t$ (nm) $\leq 1.0$. When the bending point of the t-plot for the fibrous carbon nanostructures is within any of the ranges set forth above, dispersibility of the fibrous carbon nanostructures can be increased, and electrical conductivity of a composite resin material and a shaped product can be increased using a small amount of the fibrous carbon nanostructures. Specifically, the fibrous carbon nanostructures may readily aggregate and dispersibility thereof may decrease if the value of the bending point is less than 0.2, whereas the fibrous carbon nanostructures may easily become entangled with one another and dispersibility thereof may decrease if the value of the bending point is more than 1.5.

The "position of the bending point" is defined as an intersection point of a linear approximation A for the above-described process (1) and a linear approximation B for the above-described process (3).

The fibrous carbon nanostructures preferably have a ratio (S2/S1) of internal specific surface area S2 relative to total specific surface area S1 obtained from the t-plot of at least 0.05 and not more than 0.30. When the value of S2/S1 of the fibrous carbon nanostructures is within the range set forth above, dispersibility of the fibrous carbon nanostructures can be increased, and electrical conductivity of a composite resin material and a shaped product can be increased using a small amount of the fibrous carbon nano structures.

The total specific surface area S1 and the internal specific surface area S2 of the fibrous carbon nanostructures can be determined from the t-plot for the fibrous carbon nanostructures. Specifically, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of total specific surface area S1 and internal specific surface area S2 based on t-plot analysis can be performed, for example, using a BELSORP®-mini (BELSORP is a registered trademark in Japan, other countries, or both), which is a commercially available measurement apparatus produced by Bel Japan Inc.

Moreover, it is preferable that the fibrous carbon nanostructures including CNTs that are preferable as the fibrous carbon nanostructures have a radial breathing mode (RBM) peak when evaluated by Raman spectroscopy. It should be noted that an RBM is not present in the Raman spectrum of fibrous carbon nanostructures composed only of multi-walled carbon nanotubes having three or more walls.

In a Raman spectrum of the fibrous carbon nanostructures including CNTs, a ratio of G band peak intensity relative to D band peak intensity (G/D ratio) is preferably at least 0.5 and not more than 5.0. Performance of a produced composite resin material and shaped product can be further improved when the G/D ratio is at least 0.5 and not more than 5.0.

The fibrous carbon nanostructures including CNTs can be produced by a known CNT synthetic method such as arc discharge, laser ablation, or chemical vapor deposition (CVD) without any specific limitations. Specifically, the fibrous carbon nanostructures including CNTs can, for example, be efficiently produced in accordance with a method in which, during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve the catalytic activity of the catalyst layer (super growth method; refer to WO 2006/011655 A1). Hereinafter, carbon nanotubes that are obtained by the super growth method are also referred to as "SGCNTs".

The fibrous carbon nanostructures produced by the super growth method may be composed of only SGCNTs or may include other carbon nanostructures such as non-cylindrical carbon nanostructures in addition to SGCNTs.

The amount of the fibrous carbon nanostructures in the mixed liquid per 100 parts by mass of the previously described resin particles is preferably 0.01 parts by mass or more, and more preferably 0.02 parts by mass or more, and is preferably 10 parts by mass or less, and more preferably 8 parts by mass or less. When the amount of the fibrous carbon nanostructures is at least any of the lower limits set forth above, electrical conductivity of a composite resin material and a shaped product can be increased, and surface resistivity of the shaped product can be sufficiently reduced. Moreover, the occurrence of non-uniform electrical conductivity in a shaped product due to reduced dispersibility of the fibrous carbon nanostructures can be inhibited when the amount of the fibrous carbon nanostructures is not more than any of the upper limits set forth above. Therefore, a shaped product can be caused to display sufficient antistatic performance when the amount of the fibrous carbon nanostructures is within any of the ranges set forth above.

[Dispersion Medium]

Any dispersion medium in which the resin particles and the fibrous carbon nanostructures can be dispersed may be used as the dispersion medium without any specific limitations. Of such dispersion media, it is preferable to use a dispersion medium for which a Hansen solubility parameter distance R of the dispersion medium and the resin forming the resin particles, obtained by the following formula (1), is at least 2 and not more than 14.

$$R = \{4 \times (\delta_{d1} - \delta_{d2})^2 + (\delta_{p1} - \delta_{p2})^2 + (\delta_{h1} - \delta_{h2})^2\}^{1/2} \quad (1)$$

$\delta_{d1}$: Dispersion term of resin
$\delta_{d2}$: Dispersion term of dispersion medium
$\delta_{p1}$: Polarity term of resin
$\delta_{p2}$: Polarity term of dispersion medium
$\delta_{h1}$: Hydrogen bonding term of resin
$\delta_{h2}$: Hydrogen bonding term of dispersion medium R is a parameter for which a larger value indicates lower affinity between the resin and the dispersion medium and a smaller value indicates higher affinity between the resin and the dispersion medium.

By using a dispersion medium for which R is at least 2 and not more than 14, a shaped product can be caused to display sufficient antistatic performance.

Note that the definitions and calculation methods of the Hansen solubility parameters are described in "Hansen Solubility Parameters: A User's Handbook" (CRC Press, 2007) authored by Charles M. Hansen.

Moreover, in the case of a resin or dispersion medium for which literature values for the Hansen solubility parameters thereof are not known, the Hansen solubility parameters can easily be predicted based on the chemical structure of the resin or dispersion medium using computer software (Hansen Solubility Parameters in Practice (HSPiP)).

Specifically, values for organic solvents recorded in a database may be used to predict the value for an organic solvent that is not recorded in the database using Version 3 of HSPiP, for example.

In a case in which particles of a fluororesin (PTFE, $(\delta_d, \delta_p, \delta_h) = (16.2, 1.8, 3.4)$) are used as the resin particles, for example, examples of dispersion media for which the Hansen solubility parameter distance R is at least 2 and not more than 14 include non-polar solvents such as toluene ($(\delta_d, \delta_p, \delta_h) = (18.0, 1.4, 2.0)$, R=3.9) and cyclohexane ($(\delta_d, \delta_p, \delta_h) = (16.8, 0.0, 0.2)$, R=3.9); and polar solvents such as ethers (for example, tetrahydrofuran (THF, $(\delta_d, \delta_p, \delta_h) = (16.8, 5.7, 8.0)$, R=6.1)) and ketones (for example, methyl ethyl ketone (MEK, $(\delta_d, \delta_p, \delta_h) = (16.0, 9.0, 5.1)$, R=7.4) and acetone ($(\delta_d, \delta_p, \delta_h) = (15.5, 10.4, 7.0)$, R=9.3)).

Moreover, in a case in which particles of an acrylic resin (PMMA, $(\delta_d, \delta_p, \delta_h) = (18.6, 10.5, 7.5)$) are used as the resin particles, examples of dispersion media for which the Hansen solubility parameter distance R is at least 2 and not more than 14 include non-polar solvents such as toluene ($(\delta_d, \delta_p, \delta_h) = (18.0, 1.4, 2.0)$, R=10.7) and cyclohexane ($(\delta_d, \delta_p, \delta_h) = (16.8, 0.0, 0.2)$, R=13.3); and polar solvents such as ethers (for example, tetrahydrofuran ($(\delta_d, \delta_p, \delta_h) = (16.8, 5.7, 8.0)$, R=6.1)) and ketones (for example, methyl ethyl ketone (MEK, $(\delta_d, \delta_p, \delta_h) = (16.0, 9.0, 5.1)$, R=6.0) and acetone ($(\delta_d, \delta_p, \delta_h) = (15.5, 10.4, 7.0)$, R=6.3)).

One of these solvents may be used individually, or two or more of these solvents may be used in combination in a freely selected ratio.

[Additives]

No specific limitations are placed on additives that may optionally be contained in the mixed liquid and examples thereof include known additives such as dispersants.

Examples of dispersants that may be used include known dispersants that can assist dispersion of fibrous carbon nanostructures. Specifically, a surfactant, a polysaccharide, a π-conjugated polymer, a polymer including an ethylene chain as a main chain, or the like may be used as a dispersant. Of these dispersants, a surfactant is more preferable.

The amount of additives per 100 parts by mass of the previously described resin particles is preferably 1 part by mass or less, and more preferably 0 parts by mass (i.e., the mixed liquid and slurry do not contain additives) from a viewpoint of suppressing reduction of electrical conductivity of a composite resin material and a shaped product.

[Mixing Method]

Known mixing methods can be adopted as the method by which the above-described resin particles, fibrous carbon nanostructures, dispersion medium, and optional additives are mixed without any specific limitations. Among such methods, a method in which mixing of the components set forth above is performed using a stirrer without application of pressure is preferable from a viewpoint of inhibiting damage to the fibrous carbon nanostructures.

No specific limitations are placed on the order in which the components set forth above are mixed. For example, all of the components may be mixed at once, or some of the components may be mixed and then the remainder of the components may be added and further mixed therewith. Of these examples, mixing of all of the components at once is preferable from a viewpoint of preparing a mixed liquid through a simple operation.

<Dispersing Step>

In the dispersing step, the mixed liquid obtained in the mixing step is supplied to a wet medialess disperser and is subjected to dispersion treatment under conditions in which pressure acting on the mixed liquid (gauge pressure) is 5 MPa or less to obtain a slurry.

[Pressure]

The pressure acting on the mixed liquid in the dispersing step (i.e., the pressure acting on the mixed liquid between supply thereof to the wet medialess disperser and the end of the dispersion treatment), in terms of gauge pressure, is required to be 5 MPa or less, and is preferably 4 MPa or less. More preferably, the dispersion treatment of the mixed liquid is performed without application of pressure. This is because damage to the fibrous carbon nanostructures can be inhibited and reduction of electrical conductivity of a composite resin material and a shaped product can be suppressed when the pressure acting on the mixed liquid is not more than any of the upper limits set forth above. In addition, reduction of electrical conductivity of a composite resin material and a shaped product due to excessive dispersion of the fibrous carbon nanostructures can be inhibited.

Note that because dispersion treatment in the dispersing step is performed with respect to a mixed liquid containing the specific resin particles set forth above, good dispersion of the fibrous carbon nanostructures can be achieved even without applying a high pressure to the mixed liquid.

[Wet Medialess Disperser]

Known medialess dispersers that can perform wet dispersion treatment without using dispersing media (for example, a high speed stirrer, a homogenizer, and an inline mixer) may be used as the wet medialess disperser. From a viewpoint of favorably dispersing the fibrous carbon nanostructures even under conditions in which pressure acting on the mixed liquid (gauge pressure) is 5 MPa or less, a homogenizer or an inline mixer is preferable, and a rotary homogenizer or an inline rotor-stator mixer including a fixed stator and a rotor that rotates at high speed in opposition to the stator is more preferable.

In a case in which a rotary homogenizer is used as the wet medialess disperser, it is preferable that dispersion treatment is performed under conditions in which the impeller circumferential speed is 5 m/s or more. The fibrous carbon nanostructures can be sufficiently dispersed when the impeller circumferential speed is 5 m/s or more. The treatment time is preferably at least 10 minutes and not more than 300 minutes. Moreover, it is preferable that appropriate shear force is imparted on the mixed liquid, and the shape of a rotating part of the homogenizer is preferably a serrated blade, a closed type rotor, or a rotor/stator type, for example. The slit width of the closed type rotor or the rotor/stator clearance is preferably 3 mm or less, and more preferably 1 mm or less.

Moreover, in a case in which an inline rotor-stator mixer is used as the wet medialess disperser, the dispersion treatment is preferably performed under conditions in which the impeller circumferential speed is 5 m/s or more. The fibrous carbon nanostructures can be sufficiently dispersed when the impeller circumferential speed is 5 m/s or more. The number of times that the mixed liquid passes a rotating part of the mixer is preferably 10 or more. Through 10 or more passes, the fibrous carbon nanostructures can be uniformly and favorably dispersed. The treatment time is preferably at least 10 minutes and not more than 300 minutes. Moreover, it is preferably that appropriate shear force is imparted on the mixed liquid, and the shape of the rotating part is preferably a slit type, for example. The rotor/stator clearance is preferably 3 mm or less, and more preferably 1 mm or less. Moreover, the slit width is preferably 2 mm or less, and more preferably 1 mm or less.

<Slurry>

The slurry obtained in the dispersing step set forth above contains resin originating from the previously described resin particles, the fibrous carbon nanostructures, the dispersion medium, and the optional additives.

Note that the proportions in which components are contained in the slurry are normally the same as the proportions in which the components were contained in the mixed liquid. The resin originating from the resin particles may maintain the same particulate form as in the mixed liquid or may be in a form other than a particulate form.

(Method of Producing Composite Resin Material)

The presently disclosed method of producing a composite resin material includes a step of removing the dispersion medium from the slurry produced using the presently disclosed method of producing a slurry to obtain a composite resin material. As a result of the slurry produced using the presently disclosed method of producing a slurry being used in the presently disclosed method of producing a composite resin material, it is possible to obtain a composite resin material that enables formation of a shaped product having high electrical conductivity and sufficiently low surface resistivity.

Known methods such as drying and filtration can be used without any specific limitations as the method by which the dispersion medium is removed from the slurry. Of such methods, the method by which the dispersion medium is removed is preferably drying, more preferably vacuum drying, drying through ventilation of an inert gas, drying using a spray dryer, or drying using a CD dryer, and even more preferably vacuum drying, drying using a spray dryer, or drying using a CD dryer.

In the presently disclosed method of producing a composite resin material, a composite of the resin and the fibrous carbon nanostructures that is obtained by removing the dispersion medium from the slurry may be used, as produced, as the composite resin material, or the composite may be granulated by any method such as milling or flaking to obtain the composite resin material.

(Method of Producing Shaped Product)

The presently disclosed method of producing a shaped product includes a step of shaping the composite resin material produced using the method of producing a composite resin material. As a result of the composite resin material set forth above being used in the presently disclosed method of producing a shaped product, it is possible to obtain a shaped product in which the fibrous carbon nanostructures are favorably dispersed and that has high electrical conductivity and sufficiently low surface resistivity.

Known shaping methods such as compression molding can be used without any specific limitations as the method by which the composite resin material is shaped. The shaped product obtained through shaping of the composite resin material may optionally be subjected to firing treatment.

The surface resistivity of the shaped product obtained using the presently disclosed method of producing a shaped product is less than $1\times10^9$ Ω/sq, for example, and is preferably less than $1\times10^8$ Ω/sq.

EXAMPLES

The following provides a more specific description of the present disclosure based on examples. However, the present disclosure is not limited to the following examples.

In the examples and comparative examples, the following method was used to measure and evaluate the surface resistivity of a shaped product.

<Surface Resistivity>

The surface of a post-firing shaped product was polished using waterproof abrasive paper (#3000) and then surface resistivity (Ω/sq) of the shaped product was measured using a resistivity meter (produced by Mitsubishi Chemical Analytech Co., Ltd.; product name: Hiresta MCP-HT800; probe: URSS).

Example 1

A 1 L SUS can was charged with 400 g of cyclohexane (Hansen solubility parameters: $(\delta_d, \delta_p, \delta_h)=(16.8, 0.0, 0.2)$) as a dispersion medium, 100 g of fluororesin particles (produced by Daikin Industries, Ltd.; PTFE (polytetrafluoroethylene) molding powder; product name: POLYFLON PTFE-M12; average particle diameter: 50 μm; specific gravity: 2.16; Rockwell hardness: R20; Hansen solubility parameters: $(\delta_d, \delta_p, \delta_h)=(16.2, 1.8, 3.4)$, R=3.9) as resin particles, and 0.1 g of carbon nanotubes (produced by Zeon Nano Technology Co., Ltd.; product name: ZEONANO SG101; single-walled CNTs; specific gravity: 1.7; average diameter: 3.5 nm; average length: 400 μm; BET specific surface area: 1,050 m$^2$/g; G/D ratio: 2.1; convex upward shaped t-plot) as fibrous carbon nanostructures (mixing step). Stirring was performed for 60 minutes at a temperature of 20° C. and a rotation speed of 10,000 rpm (impeller circumferential speed: 10 m/s) using a homogenizer (produced by PRIMIX Corporation; product name: LABOLUTION® (LABOLUTION is a registered trademark in Japan, other countries, or both), NEO MIXER® (NEO MIXER is a registered trademark in Japan, other countries, or both)) to obtain a slurry containing fluororesin particles and carbon nanotubes (dispersing step).

Next, centrifugal separation of the slurry was performed using a centrifugal separator (produced by Thinky Corporation; product name: Planetary Centrifugal Mixer THINKY MIXER ARE-310) and then supernatant dispersion medium was removed. Thereafter, vacuum drying was performed for 12 hours at a temperature of 80° C. using a vacuum dryer (produced by Yamato Scientific Co., Ltd.) to obtain a composite (composite resin material) of a fluororesin and carbon nanotubes. Next, the obtained composite was milled using a mill mixer and the resultant particles of the composite resin material were loaded into a mold. Preliminary shaping was performed using a compression molding machine (produced by Dumbbell Co., Ltd.; model no.: SDOP-1032IV-2HC-AT) under conditions of a temperature of 20° C., a pressure of 21 MPa, and a pressure holding time of 5 minutes to obtain a preliminary shaped product in the form of a sheet of 130 mm (length)×80 mm (width)×20 mm (thickness). The preliminary shaped product was removed from the mold and was fired for 6 hours at 370° C. in a free state inside a convection furnace to obtain a shaped product. Surface resistivity was evaluated using the obtained shaped product. The results are shown in Table 1.

Note that a Rockwell hardness of R20 (R scale measurement value), which is the Rockwell hardness of the fluororesin particles, is smaller than M20 when taken as an M scale-converted value.

Example 2

A slurry and a shaped product were produced in the same way as in Example 1 with the exception that the fluororesin particles (produced by Daikin Industries, Ltd.; PTFE (polytetrafluoroethylene) molding powder; product name: POLYFLON PTFE-M12) used as the resin particles were replaced with different fluororesin particles (produced by Asahi Glass Co., Ltd.; PTFE powder; product name: Fluon PTFE-CD1; average particle diameter: 500 μm; specific gravity: 2.16; Rockwell hardness: R20; Hansen solubility parameters: $(\delta_d, \delta_p, \delta_h)=(16.2, 1.8, 3.4)$, R=3.9). Evaluation was performed in the same way as in Example 1. The results are shown in Table 1.

Example 3

A slurry and a shaped product were produced in the same way as in Example 1 with the exception that the fluororesin particles (produced by Daikin Industries, Ltd.; PTFE (polytetrafluoroethylene) molding powder; product name: POLYFLON PTFE-M12) used as the resin particles were replaced with different fluororesin particles (produced by 3M; PTFE powder; product name: Dyneon TF 9207 Z; average particle diameter: 4 μm; specific gravity: 2.16; Rockwell hardness: R20; Hansen solubility parameters: $(\delta_d, \delta_p, \delta_h)=(16.2, 1.8, 3.4)$, R=3.9). Evaluation was performed in the same way as in Example 1. The results are shown in Table 1.

Example 4

A slurry and a shaped product were produced in the same way as in Example 1 with the exception that a CAVITRON (produced by Pacific Machinery & Engineering Co., Ltd.; product name: CD1000; rotor/stator: slit type; slit width: 0.4 mm), which is an inline mixer, was used as a disperser instead of the homogenizer (produced by PRIMIX Corporation; product name: LABOLUTION®, NEO MIXER®), and dispersion treatment was performed for 60 minutes with a rotation speed of 18,000 rpm (impeller circumferential speed: 40 m/s) and a pressure of 0.4 MPa. Evaluation was performed in the same way as in Example 1. The results are shown in Table 1.

Example 5

A slurry and a shaped product were produced in the same way as in Example 1 with the exception that the fluororesin particles (produced by Daikin Industries, Ltd.; PTFE (polytetrafluoroethylene) molding powder; product name: POLYFLON PTFE-M12) used as the resin particles were replaced with acrylic resin particles (produced by Goodfellow; polymethyl methacrylate (PMMA) powder; product name: ME306020; average particle diameter: 600 μm; specific gravity: 1.19; Rockwell hardness: M100; Hansen solubility parameters: $(\delta_d, \delta_p, \delta_h)=(18.6, 10.5, 7.5)$, R=13.3). Evaluation was performed in the same way as in Example 1. The results are shown in Table 1.

Comparative Example 1

A slurry and a shaped product were produced in the same way as in Example 1 with the exception that the fluororesin particles (produced by Daikin Industries, Ltd.; PTFE (polytetrafluoroethylene) molding powder; product name: POLYFLON PTFE-M12) used as the resin particles were replaced with different fluororesin particles (produced by Kitamura Limited; PTFE powder; product name: KTL-500F; average particle diameter: 0.5 μm; specific gravity: 2.16; Rockwell hardness: R20; Hansen solubility parameters: $(\delta_d, \delta_p, \delta_h)=$ (16.2, 1.8, 3.4), R=3.9). Evaluation was performed in the same way as in Example 1. The results are shown in Table 1.

Comparative Example 2

A slurry and a shaped product were produced in the same way as in Example 1 with the exception that a wet jet mill (produced by Yoshida Kikai Co., Ltd.; product name: L-ES007) was used as a disperser instead of the homogenizer (produced by PRIMIX Corporation; product name: LABOLUTION®, NEO MIXER®), and dispersion treatment was performed with a pressure of 50 MPa. Evaluation was performed in the same way as in Example 1. The results are shown in Table 1.

TABLE 1

|  |  |  | Example 1 | Example 2 | Example 3 | Example 4 | Example 5 | Comparative Example 1 | Comparative Example 2 |
|---|---|---|---|---|---|---|---|---|---|
| Mixed liquid | Resin particles | Type | PTFE | PTFE | PTFE | PTFE | PMMA | PTFE | PTFE |
|  |  | Amount [parts by mass] | 100 | 100 | 100 | 100 | 100 | 100 | 100 |
|  |  | Concentration [mass %] | 20 | 20 | 20 | 20 | 20 | 20 | 20 |
|  |  | Average particle diameter [μm] | 50 | 500 | 4 | 50 | 600 | 0.5 | 50 |
|  |  | Specific gravity [—] | 2.16 | 2.16 | 2.16 | 2.16 | 1.19 | 2.16 | 2.16 |
|  |  | Rockwell hardness [—] | R20 | R20 | R20 | R20 | M100 | R20 | R20 |
|  | Fibrous carbon nanostructures | Type | SG101 | SG101 | SG101 | SG101 | SG101 | SG101 | SG101 |
|  |  | Amount [parts by mass] | 0.1 | 0.1 | 0.1 | 0.1 | 0.1 | 0.1 | 0.1 |
|  | Dispersion medium | Type | Cyclohexane | Cyclohexane | Cyclohexane | Cyclohexane | Cyclohexane | Cyclohexane | Cyclohexane |
|  |  | Hansen solubility parameter distance R [—] | 3.9 | 3.9 | 3.9 | 13.3 | 3.9 | 3.9 | 3.9 |
| Dispersion treatment | Disperser |  | NEO MIXER | NEO MIXER | NEO MIXER | CAVITRON | NEO MIXER | NEO MIXER | Jet mill |
|  | Pressure [MPa] |  | 0 | 0 | 0 | 0.4 | 0 | 0 | 50 |
|  | Impeller circumferential speed [m/s] |  | 10 | 10 | 10 | 40 | 10 | 10 | — |
|  | Treatment time [min] |  | 60 | 60 | 60 | 60 | 60 | 60 | — |
| Evaluation result | Surface resistivity [Ω/sq] |  | $3.3 \times 10^6$ | $2 \times 10^6$ | $5 \times 10^8$ | $7.5 \times 10^5$ | $6.6 \times 10^7$ | $2 \times 10^{15}$ | $3.1 \times 10^{15}$ |

It can be seen from Table 1 that in Examples 1 to 5 in which resin particles having a specific average particle diameter were used and in which treatment was performed using a wet medialess disperser under conditions in which pressure acting on the mixed liquid was 5 MPa or less, shaped products having excellent surface resistivity were obtained. In contrast, dispersibility of carbon nanotubes was inadequate and surface resistivity of a shaped product was high in Comparative Example 1 as a result of the resin particles having a small average particle diameter. Moreover, carbon nanotubes were excessively dispersed and surface resistivity of the obtained shaped product was high in Comparative Example 2 as a result of dispersion treatment being performed under conditions in which pressure acting on the mixed liquid was at least 5 MPa.

INDUSTRIAL APPLICABILITY

A slurry in which fibrous carbon nanostructures are favorably dispersed can easily be produced through the presently disclosed method of producing a slurry.

Moreover, a composite resin material capable of forming a shaped product in which dispersibility of fibrous carbon nanostructures is excellent and that has excellent electrical conductivity is obtained through the presently disclosed method of producing a composite resin material.

Furthermore, a shaped product having excellent properties such as electrical conductivity is obtained through the presently disclosed method of producing a shaped product.

The invention claimed is:

1. A method of producing a slurry comprising:
   a mixing step of mixing resin particles having an average particle diameter of at least 1 μm and not more than 700 μm, fibrous carbon nanostructures, and a dispersion medium to obtain a mixed liquid; and
   a dispersing step of subjecting the mixed liquid to dispersion treatment using a wet medialess disperser, wherein the wet medialess disperser performs wet dispersion treatment without using dispersing media under conditions in which pressure acting on the mixed liquid, in terms of gauge pressure, is 5 MPa or less to obtain a slurry, wherein
   the wet medialess disperser is a rotary homogenizer or an inline rotor-stator mixer including a fixed stator and a rotor that rotates at high speed in opposition to the stator.

2. The method of producing a slurry according to claim 1, wherein content of the resin particles in the mixed liquid is at least 1 mass% and not more than 30 mass%.

3. The method of producing a slurry according to claim 1, wherein a Hansen solubility parameter distance R of the dispersion medium and a resin forming the resin particles, obtained by formula (1) shown below, is at least 2 and not more than 14, $$R = \{4 \times (\delta_{d1} - \delta_{d2})^2 + (\delta_{p1} - \delta_{p2})^2 + (\delta_{h1} - \delta_{h2})^2\}^{1/2} \quad (1)$$

where where $\delta_{d1}$ is dispersion term of the resin, $\delta_{d2}$ is a dispersion term of the dispersion medium, $\delta_{p1}$ is a polarity term of the resin, $\delta_{p2}$ is a polarity term of the dispersion medium, $\delta_{h1}$ is a hydrogen bonding term of the resin, and $\delta_{h2}$ is a hydrogen bonding term of the dispersion medium.

4. The method of producing a slurry according to claim 1, wherein the mixed liquid contains the fibrous carbon nanostructures in a proportion of at least 0.01 parts by mass and not more than 10 parts by mass per 100 parts by mass of the resin particles.

5. The method of producing a slurry according to claim 1, wherein the resin particles are fluororesin particles, acrylic resin particles, polycarbonate resin particles, or cycloolefin resin particles.

6. A method of producing a composite resin material comprising a step of removing the dispersion medium from a slurry produced using the method of producing a slurry according to claim 1 to form a composite resin material.

7. A method of producing a shaped product comprising a step of shaping a composite resin material produced using the method of producing a composite resin material according to claim 6.

8. The method of producing a slurry according to claim 1, wherein that the mixed liquid does not contain dispersing agent, or dispersants other than dispersion medium.

* * * * *